United States Patent
Mehrara et al.

(10) Patent No.: US 9,645,802 B2
(45) Date of Patent: May 9, 2017

(54) TECHNIQUE FOR GROUPING INSTRUCTIONS INTO INDEPENDENT STRANDS

(71) Applicant: NVIDIA CORPORATION, Santa Clara, CA (US)

(72) Inventors: Mojtaba Mehrara, San Francisco, CA (US); Michael Garland, Lake Elmo, MN (US); Gregory Diamos, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 261 days.

(21) Appl. No.: 13/961,097

(22) Filed: Aug. 7, 2013

(65) Prior Publication Data
US 2015/0046684 A1    Feb. 12, 2015

(51) Int. Cl.
G06F 9/45 (2006.01)
G06F 9/38 (2006.01)

(52) U.S. Cl.
CPC .......... *G06F 8/45* (2013.01); *G06F 8/41* (2013.01); *G06F 8/433* (2013.01); *G06F 9/3851* (2013.01)

(58) Field of Classification Search
CPC .................. G06F 8/443; G06F 8/41
USPC ....................... 717/151, 156, 140
See application file for complete search history.

(56) References Cited

U.S. PATENT DOCUMENTS

| | | | | |
|---|---|---|---|---|
| 5,421,022 A * | 5/1995 | McKeen | ........... | G06F 9/3865 712/23 |
| 6,216,220 B1 * | 4/2001 | Hwang | ........... | G06F 9/3851 712/219 |
| 6,279,100 B1 * | 8/2001 | Tremblay | ........... | G06F 9/30112 712/219 |
| 8,677,312 B1 * | 3/2014 | Braun et al. | ........... | 717/106 |
| 8,689,202 B1 * | 4/2014 | Braun et al. | ........... | 717/161 |
| 2001/0052064 A1 * | 12/2001 | Chaudhry | ........... | G06F 9/383 712/225 |
| 2007/0186081 A1 * | 8/2007 | Chaudhry | ........... | G06F 9/30181 712/214 |
| 2008/0133897 A1 * | 6/2008 | Reid et al. | ........... | 712/227 |

(Continued)

OTHER PUBLICATIONS

Bhowmik et al., "A General Compiler Framework for Speculative Multithreaded Processors", 2004.*

(Continued)

*Primary Examiner* — Phillip H Nguyen
(74) *Attorney, Agent, or Firm* — Artegis Law Group, LLP (57) ABSTRACT

A device compiler and linker is configured to group instructions into different strands for execution by different threads based on the dependence of those instructions on other, long-latency instructions. A thread may execute a strand that includes long-latency instructions, and then hardware resources previously allocated for the execution of that thread may be de-allocated from the thread and re-allocated to another thread. The other thread may then execute another strand while the long-latency instructions are in flight. With this approach, the other thread is not required to wait for the long-latency instructions to complete before acquiring hardware resources and initiating execution of the other strand, thereby eliminating at least a portion of the time that the other thread would otherwise spend waiting.

20 Claims, 8 Drawing Sheets

(56) References Cited

U.S. PATENT DOCUMENTS

2011/0072244 A1* 3/2011 Lindholm et al. ............ 712/214
2011/0172969 A1* 7/2011 Gara et al. ................... 702/186

OTHER PUBLICATIONS

Cui et al., "An Accurate GPU Performance Model for Effective Control Flow Divergence Optimization", 2012.*
Zhong et al., "Extending Multicore Architectures to Exploit Hybrid Parallelism in Single-thread Applications", 2007.*
Xu et al., "Support for Software Performance Tuning on Network Processors", 2003.*
Marquez et al., "A Superstand Architecture", 1997.*
Lazy Threads: Compiler and Runtime Structures for Fine-Grained Parallel Programming, 1985.*
Zhuang et al., "Effective Thread Management on Network Processors with Compiler Analysis", 2006.*
Chu et al., "Region-based Hierarchical Operation Partitioning for Multicluster Processors", 2003.*
Gebhart et al., "A compile-Time Managed Multi-Level Register File Hierarchy", 2011.*

* cited by examiner

TECHNIQUE FOR GROUPING INSTRUCTIONS INTO INDEPENDENT STRANDS

GOVERNMENT RIGHTS IN THIS INVENTION

This invention was made with U.S. government support under LLNS subcontract B599861 awarded by DOE, and with government support under agreement No. HR0011-13-3-0001 awarded by DARPA. The U.S. government has certain rights in this invention.

BACKGROUND OF THE INVENTION

Field of the Invention

The present invention generally relates to multithreaded programming and, more specifically, to a technique grouping instructions into independent strands.

Description of the Related Art

In a multithreaded processing paradigm, a processing unit may execute multiple threads. Those threads may share a hardware resource in order to execute different portions of a multithreaded software program. For example, a first thread could execute using the hardware resource to implement a first portion of the multithreaded program while a second thread waits for access to the hardware resource. When the first thread completes execution, the second thread could then execute a second portion of the multithreaded program using the hardware resource. The hardware resource could be, for example, an execution unit, an arithmetic logic unit, a processing core, or any such hardware resource.

Problems arise with the approach described above when the multithreaded software program involves long-latency instructions, such as load instructions or texture fetch operations. If one of the multiple threads must perform a long-latency instruction, then the other threads are forced to wait until that long-latency instruction completes before gaining access to the shared hardware resource. Returning to the example described above, if the first thread issues a load instruction, the second thread cannot access the hardware resource until after the load instruction completes.

Consequently, during the time spent waiting for the load instruction to complete, the hardware resource cannot perform any useful work. With multithreaded software programs that include numerous long-latency instructions, a large portion of time may be spent waiting for long-latency instructions to complete, and a very small portion of time may be spent executing other instructions. In short, the execution of conventional multithreaded software programs fails to efficiently utilize limited hardware resources.

As the foregoing illustrates, what is needed in the art is a more efficient technique for executing multithreaded software applications.

SUMMARY OF THE INVENTION

One embodiment of the present invention includes a computer-implemented method for compiling program code for execution on a processing unit, including generating a weight value for each program instruction included in a basic block of the program code, where the weight value associated with a given program instruction reflects a number of long-latency program instructions upon which the given program instruction depends, grouping the program instructions included in the basic block into a first strand and a second strand based on the weight values generated for the program instructions, where the first strand includes a first set of program instructions that have a first weight value, and the second strand includes a second set of program instructions that have a second weight value, causing a first thread to process the first strand, and causing a second thread to process the second strand.

One advantage of the disclosed techniques is that a processing core that executes different strands may operate more efficiently and with fewer idle cycles compared to conventional processing cores, thereby increasing the processing throughput of that processing core as well as the energy efficiency of the processing core.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
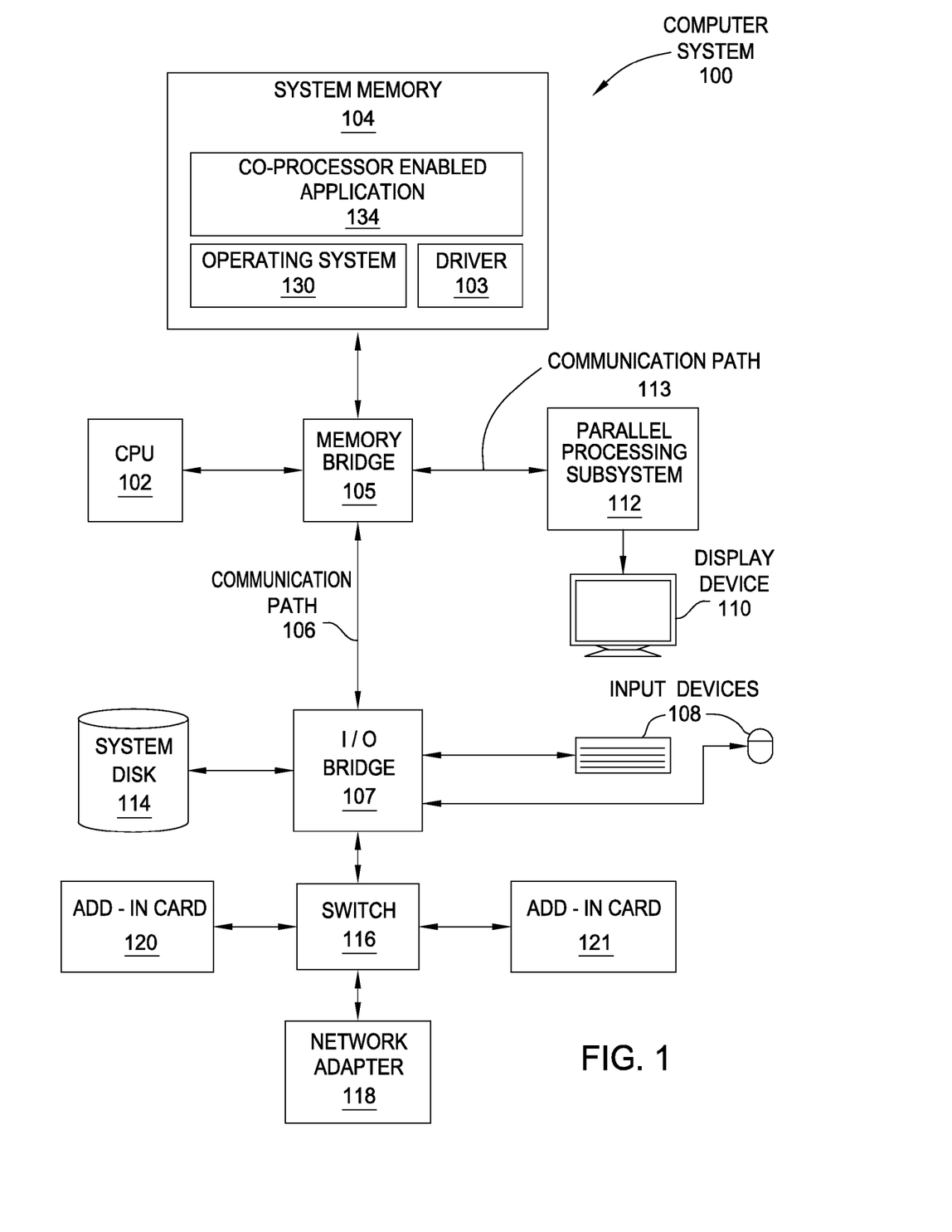
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. System memory 104 includes an image of an operating system 130, a driver 103, and a co-processor enabled application 134. Operating system 130 provides detailed instructions for managing and coordinating the operation of computer system 100. Driver 103 provides detailed instructions for managing and coordinating operation of parallel processing subsystem 112 and one or more parallel processing units (PPUs) residing therein, as described in greater detail below in conjunction with FIG. 2. Driver 103 also provides compilation facilities for generating machine code specifically optimized for such PPUs, as described in greater detail below in conjunction with FIGS. 3-7. Co-processor enabled application 134 incorporates instructions capable of being executed on the CPU 102 and PPUs, those instructions being implemented in an abstract format, such as virtual assembly, and mapping to machine code for the PPUs within parallel processing subsystem 112. The machine code for those PPUs may be stored in system memory 104 or in memory coupled to the PPUs.

In one embodiment, co-processor enabled application 134 represents CUDA™ code that incorporates programming instructions intended to execute on parallel processing subsystem 112. In the context of the present description, the term "application" or "program" refers to any computer code, instructions, and/or functions that may be executed using a processor. For example, in various embodiments, co-processor enabled application 134 may include C code, C++ code, etc. In one embodiment, co-processor enabled application 134 may include a language extension of a computer language (e.g., C, C++, etc.).

Memory bridge 105, which may be, e.g., a Northbridge chip, is connected via a bus or other communication path 106 (e.g., a HyperTransport link) to an input/output (I/O) bridge 107. I/O bridge 107, which may be, e.g., a Southbridge chip, receives user input from one or more user input devices 108 (e.g., keyboard, mouse) and forwards the input to CPU 102 via communication path 106 and memory bridge 105. Parallel processing subsystem 112 is coupled to memory bridge 105 via a bus or second communication path 113 (e.g., a Peripheral Component Interconnect Express (PCIe), Accelerated Graphics Port (AGP), or HyperTransport link); in one embodiment parallel processing subsystem 112 is a graphics subsystem that delivers pixels to a display device 110 that may be any conventional cathode ray tube, liquid crystal display, light-emitting diode display, or the like. A system disk 114 is also connected to I/O bridge 107 and may be configured to store content and applications and data for use by CPU 102 and parallel processing subsystem 112. System disk 114 provides non-volatile storage for applications and data and may include fixed or removable hard disk drives, flash memory devices, and compact disc (CD) read-only memory (ROM), digital video disc (DVD) ROM, Blu-ray, high-definition (HD) DVD, or other magnetic, optical, or solid state storage devices.

A switch 116 provides connections between I/O bridge 107 and other components such as a network adapter 118 and various add-in cards 120 and 121. Other components (not explicitly shown), including universal serial bus (USB) or other port connections, CD drives, DVD drives, film recording devices, and the like, may also be connected to I/O bridge 107. The various communication paths shown in FIG. 1, including the specifically named communication paths 106 and 113 may be implemented using any suitable protocols, such as PCIe, AGP, HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements in a single subsystem, such as joining the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip instead of existing as one or more discrete devices. Large embodiments may include two or more CPUs 102 and two or more parallel processing subsystems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
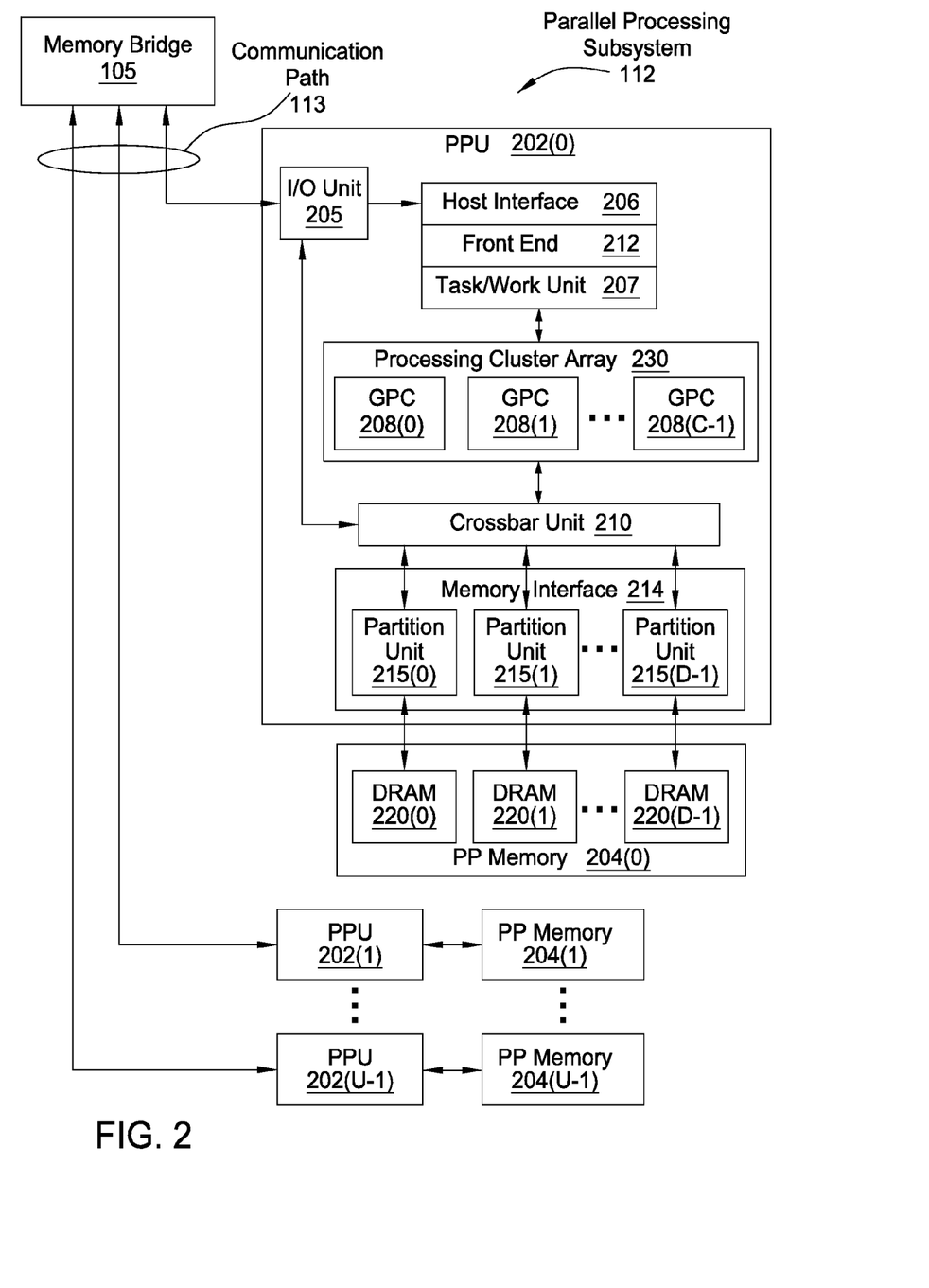
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U is greater than or equal to 1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring to FIG. 1 as well as FIG. 2, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and the second communication path 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have a dedicated parallel processing memory device(s) or no dedicated parallel processing memory device(s). One or more PPUs 202 in parallel processing subsystem 112 may output data to display device 110 or each PPU 202 in parallel processing subsystem 112 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. PPU 202 reads command streams from one or more pushbuffers and then executes commands asynchronously relative to the operation of CPU 102. Execution priorities may be specified for each pushbuffer by an application program via device driver 103 to control scheduling of the different pushbuffers.

Each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCIe link, as mentioned above, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to processing tasks that are encoded as task metadata (TMD) and stored in memory. The pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task. Processing tasks can also be received from the processing cluster array 230. Optionally, the TMD can include a parameter that controls whether the TMD is added to the head or the tail for a list of processing tasks (or list of pointers to the processing tasks), thereby providing another level of control over priority.

Memory interface 214 includes a number D of partition units 215 that are each directly coupled to a portion of parallel processing memory 204, where D≥1. As shown, the number of partition units 215 generally equals the number of dynamic random access memory (DRAM) 220. In other embodiments, the number of partition units 215 may not equal the number of memory devices. Persons of ordinary skill in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

Each GPC 208 may be configured to execute a large number of threads in parallel, where the term "thread" refers to an instance of a particular program executing on a particular set of input data. A given GPC 208 may include a set of processing cores, where each processing core includes hardware resources capable of supporting the parallel execution of one or more different threads. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons of ordinary skill in the art will understand that a SIMD processing regime represents a functional subset of a SIMT processing regime.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI Express) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Referring back now to FIG. 1, driver 103 is configured to compile co-processor enabled application 134 for execution on one or more of PPUs 202. In performing this compilation, driver 103 may implement a generic build process that is implemented by a system described in greater detail below in conjunction with FIG. 3. Driver 103 may also perform more specific compilation steps in order to increase the efficiency with which PPUs 202 may execute co-processor enabled application 134, as described in greater detail below in conjunction with FIGS. 4-7.

Figure 3:
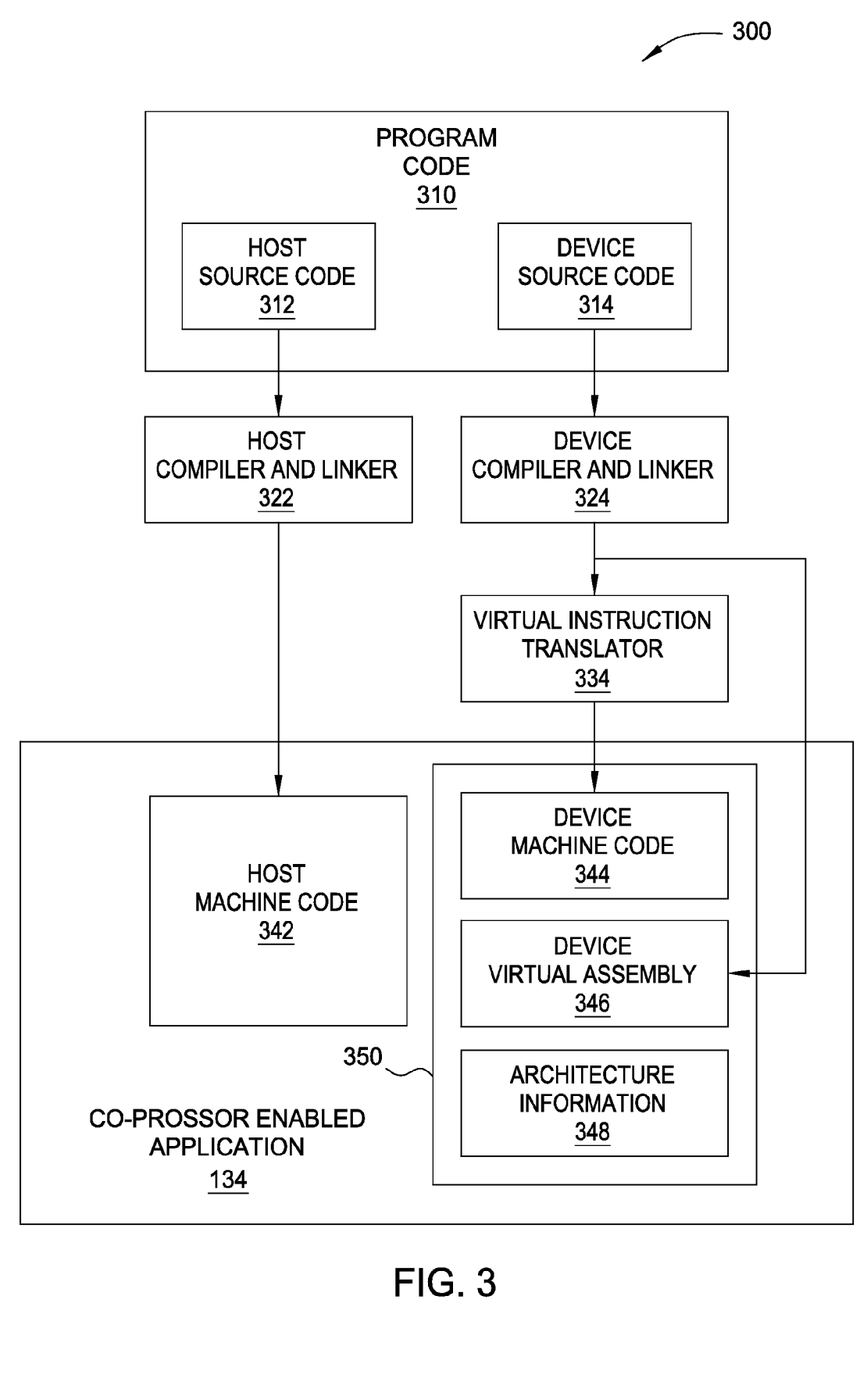
FIG. 3 is a block diagram of a system configured to compile a co-processor enabled application, according to one embodiment of the present invention.

FIG. 3 is a block diagram of a system 300 configured to compile the co-processor enabled application 134 of FIG. 1, according to one embodiment of the present invention. As shown, system 300 includes program code 310 and co-processor enabled application 134, also shown in FIG. 1. Program code 310 includes host source code 312 and device source code 314. Host source code 312 incorporates programming instructions intended to execute on a host, such as an x86-based personal computer (PC) or server. The programming instructions in source code 312 may include calls to functions defined in device source code 314. Any technically feasible mechanism may be used to specify which functions are designated as device source code 314.

Host source code 312 is pre-processed, compiled, and linked by a host compiler and linker 322. The host compiler and linker 322 generates host machine code 342, which is stored within co-processor enabled application 134.

Device source code 314 is pre-processed, compiled and linked by a device compiler and linker 324. This compile operation constitutes a first stage compile of device source code 314. Device compiler and linker 324 generates device virtual assembly 346, which is stored within a device code repository 350, residing with or within co-processor enabled application 134. A virtual instruction translator 334 may generate device machine code 324 from device virtual assembly 346. This compile operation constitutes a second stage compile of device source code 314. Virtual instruction translator 334 may generate more than one version of device machine code 344, based on the availability of known architecture definitions. For example, virtual instruction translator 334 may generate a first version of device machine code 344, which invokes native 64-bit arithmetic instructions (available in the first target architecture) and a second version of device machine code 344, which emulates 64-bit arithmetic functions on targets that do not include native 64-bit arithmetic instructions.

Architectural information 348 indicates the real architecture version used to generate device machine code 344. The real architecture version defines the features that are implemented in native instructions within a real execution target, such as the PPU 202. Architectural information 348 also indicates the virtual architecture version used to generate device virtual assembly 346. The virtual architecture version defines the features that are assumed to be either native or easily emulated and the features that are not practical to emulate. For example, atomic addition operations are not practical to emulate at the instruction level, although they may be avoided altogether at the algorithmic level in certain cases and, therefore, impact which functions may be compiled in the first compile stage.

In addition to the device machine code 344 and device virtual assembly 346, the device code repository also includes architecture information 348, which indicates which architectural features were assumed when device machine code 344 and device virtual assembly 346 where generated. Persons skilled in the art will recognize that the functions included within device machine code 344 and virtual assembly 346 reflect functions associated with the real architecture of PPU 202. The architecture information 348 provides compatibility information for device machine code 344 and compiler hints for a second stage compile operation, which may be performed by a device driver 103 at some time after the development of co-processor enabled application 134 has already been completed.

Independent Region Formation and Instruction Grouping

Device compiler and linker 324 is configured to modify program code 310 in order to increase the efficiency and flexibility with which portions of that program code 310 may be executed by processing cores within PPU 202. In particular, device compiler and linker 324 is configured to group instructions into different strands for execution by different threads based on the dependence of those instructions on other, long-latency instructions. In the context of this disclosure, a long-latency instruction may be a load instruction, a texture operation, or other such operations with potentially lengthy execution times. In addition, device compiler and linker 324 may also group instructions into different strands based on the dependence of those instructions on other instructions that have a variable or non-deterministic latency.

Once the instructions are grouped into strands, a thread may execute a strand that includes long-latency or variable-latency instructions. Hardware resources previously allocated for the execution of that thread may then be de-allocated from the thread. Those hardware resources may then be re-allocated to another thread, and that other thread may then execute another strand while the long-latency or variable-latency instructions are in flight. With this approach, the other thread is not required to wait for the long-latency or variable-latency instructions to complete before acquiring hardware resources and initiating execution of the other strand, thereby eliminating at least a portion of the time that the other thread may need to spend waiting. Consequently, a processing core that executes the different strands may operate more efficiently and with fewer idle cycles compared to conventional processing cores, thereby increasing the processing throughput of that processing core as well as the energy efficiency of the processing core.

Figure 4:
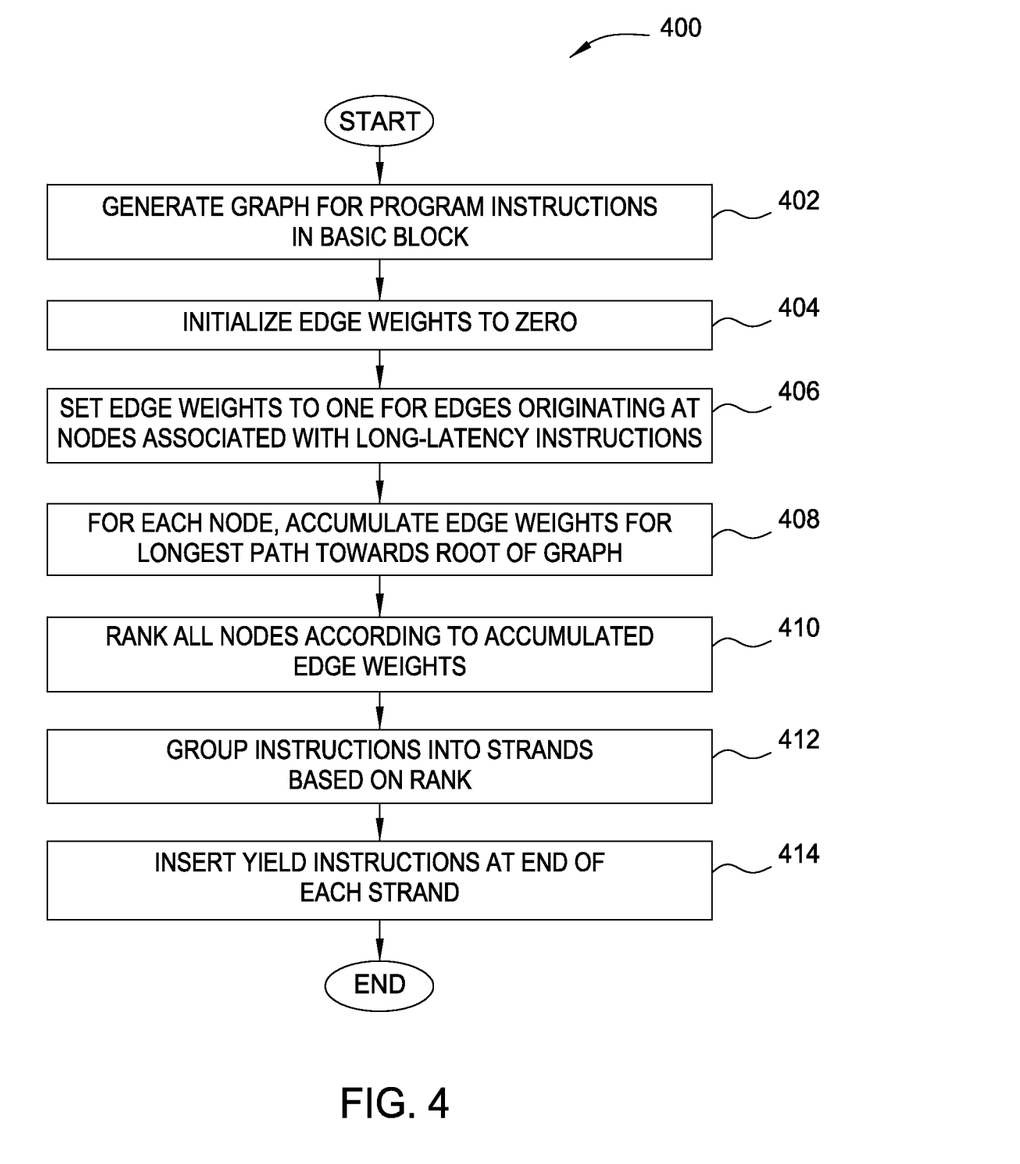
FIG. 4 is a flow diagram of method steps for grouping instructions into different strands that may be executed by different threads, according to one embodiment of the present invention.

An approach for grouping instructions into different strands that may be executed by different threads is described below in conjunction with FIG. 4. An exemplary application of the approach described in FIG. 4 is set forth below in conjunction with FIGS. 5A-5C. An approach for grouping instructions into different strands according to hardware-imposed constraints is described below in conjunction with FIG. 6. An exemplary application of the approach described in FIG. 6 is set forth below in conjunction with FIGS. 7A-7F.

FIG. 4 is a flow diagram of method steps for grouping instructions into different strands that may be executed by different threads, according to one embodiment of the present invention. Although the method steps are described in conjunction with the systems of FIGS. 1-3, persons skilled in the art will understand that any system configured to perform the method steps, in any order, is within the scope of the present invention.

As shown, a method 400 begins at step 402, where device compiler and linker 324 generates a graph for program instructions in a basic block of code derived from program code 310. In one embodiment, the graph is a directed, acyclic graph where each node represents an instruction and each edge represents a dependency between instructions. The graph generated at step 402 is described in greater detail below in conjunction with FIGS. 5A-5C.

At step 404, device compiler and linker 324 initializes the edge weights of the graph to zero. At step 406, device compiler and linker 324 sets the edge weights to one for edges originating at nodes associated with long-latency instructions. At step 408, device compiler and linker 324 accumulates edge weights for the longest path towards the root of the graph for each different node, thereby generating a longest weighted path value for each such node. At step 410, device compiler and linker 324 ranks all of the nodes in the graph according to the accumulated edge weights. At step 412, device compiler and linker 324 groups the instructions associated with the nodes into strands based on the ranking provided in lieu of step 410. At step 414, device compiler and linker 324 inserts a yield instruction at the end of each strand. The method 400 then ends.

Device compiler and linker 324 may insert the yield instruction at the end of a given strand in order to cause a thread that executes the strand to "yield" hardware resources to another thread that executes another strand. With this approach, a thread that executes long-latency instructions may release hardware resources to another thread while those long-latency instructions are in flight. In other words, hardware resources allocated to the thread associated with the long-latency instructions may be de-allocated and then re-allocated to the other thread during the time that the long-latency instructions are in flight. When the long-latency instructions are completed (e.g., data associated with a long-latency load operation is returned), the thread associated with those instructions may be re-allocated the hardware resources in order to complete execution of the strand. The approach described thus far is described in greater detail by way of example below in conjunction with FIGS. 5A-5C.

Figure 5A:
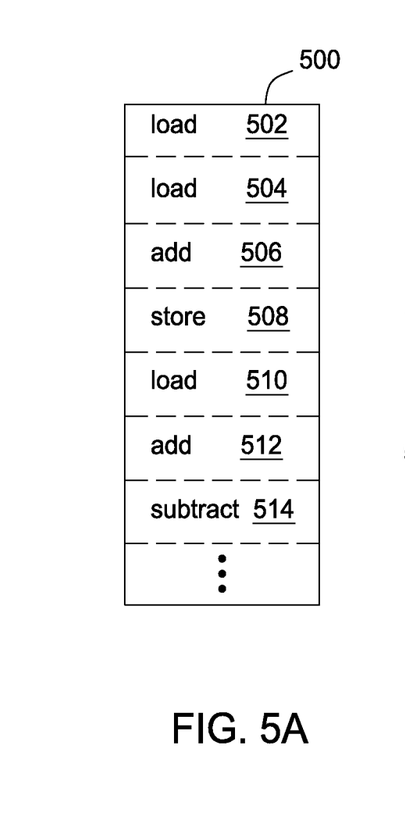
FIGS. 5A-5C illustrate an exemplary application of the method steps of FIG. 4 to an exemplary basic block of program code, according to one embodiment of the present invention.
Figure 5B:
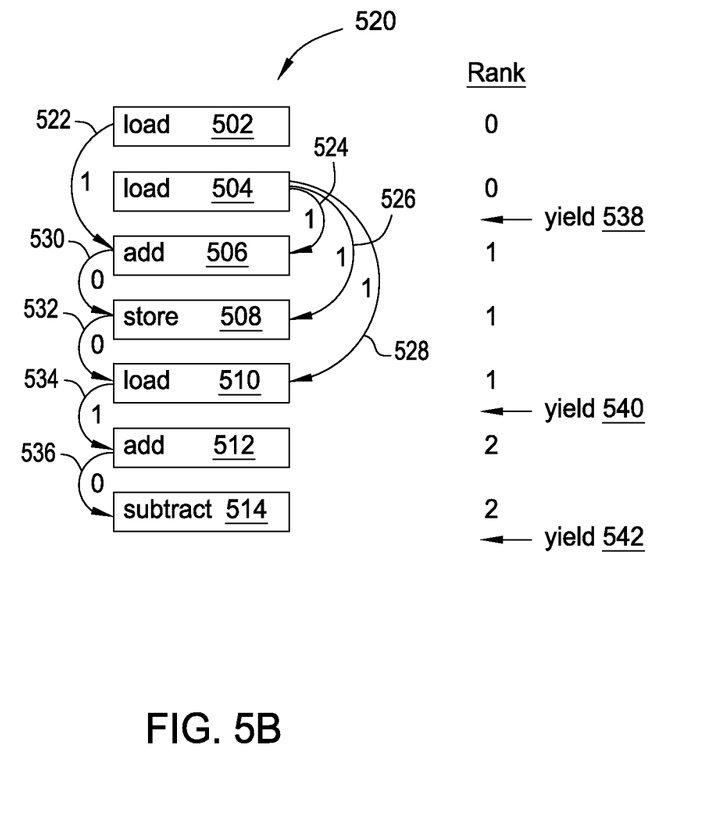
Figure 5C:
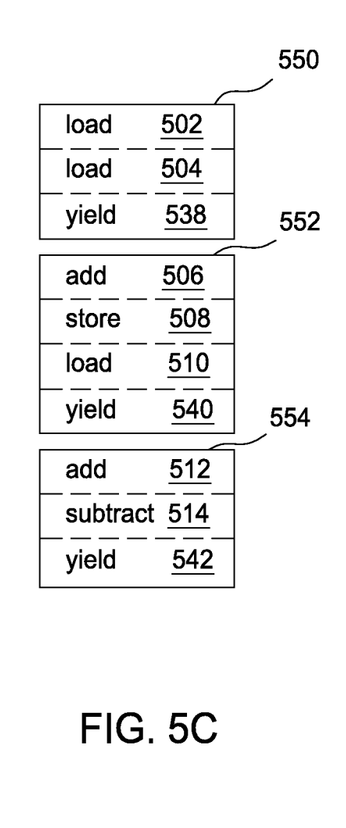
Figure 6:
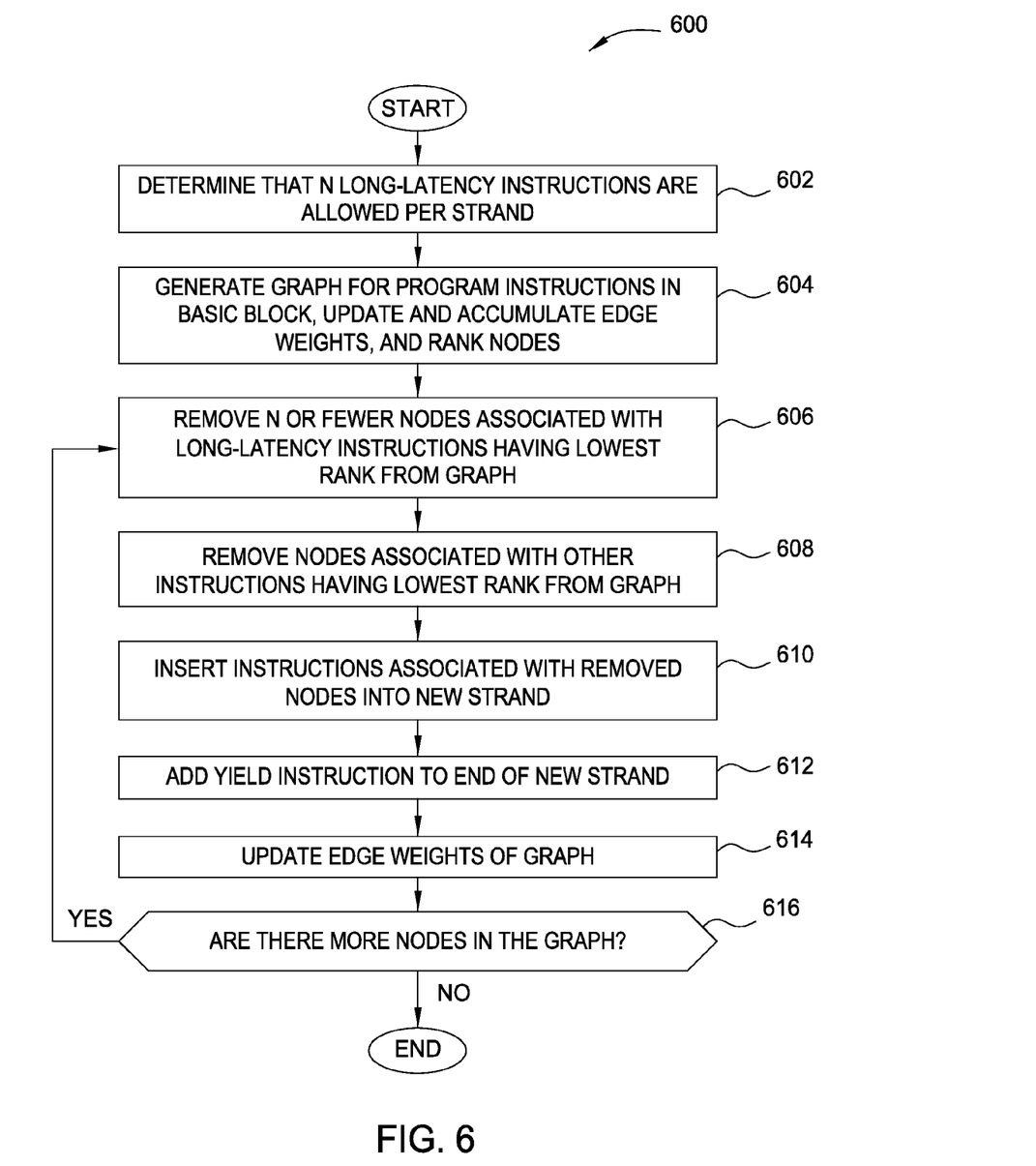
FIG. 6 is a flow diagram of method steps for grouping instructions into different strands that may be executed by different threads according to hardware-imposed constraints on the number of long-latency instructions allowed per strand, according to one embodiment of the present invention.

FIGS. 5A-5C illustrate an exemplary application of the method steps of FIG. 4 to an exemplary basic block of program code, according to one embodiment of the present invention. FIG. 5A illustrates a basic block 500 of program code that may be separated into strands, according to one embodiment of the invention.

As shown, basic block 500 includes a sequence of instructions, including a load 502, a load 504, an add 506, a store 508, a load 510, an add 512, and a subtract 514. The different instructions shown in FIG. 5A may have dependencies between one another. Those dependencies may be captured when device compiler and linker 324 generates a graph based on basic block 500, as mentioned above and as described in greater detail below in conjunction with FIG. 5B.

FIG. 5B illustrates a graph 520 that includes nodes corresponding to the instructions shown in FIG. 5A as well as edges that connect those nodes to one another and represent dependencies between the associated instructions, according to one embodiment of the present invention. As shown, edge 522 couples load 502 to add 506. Edges 524, 526, and 528 couple load 504 to add 506, store 508, and load 510, respectively. Edge 530 couples add 506 to store 508. Edge 532 couples store 508 to load 510. Edge 534 couples load 510 to add 512. Edge 536 couples add 512 to subtract 514. Again, the edges included within graph 520 represent dependencies between the instructions included within that graph. For example, edges 522 and 524 indicate that add 506 depends on load 502 and load 504. Add 506 could be executed to add together the values returned by loads 502 and 504. Persons skilled in the art will recognize that the dependencies represented within graph 520 are discernible based on dataflow analysis of program code 310.

Device compiler and linker 324 is configured to analyze program code 310, determine the dependencies between instructions included within program code 310, and then generate graph 520, similar to step 402 of the method 400 shown in FIG. 4. Device compiler and linker 324 is also configured to initialize the edge weights to zero, similar to step 404 of the method 400. Device compiler and linker 324 may then set edge weights that originate at long-latency instructions to one, similar to step 406 of the method 400. Such long-latency instructions could be, in the example described herein, load 502, 504, or 510. As is shown, edge 522 that originates at load 502 has a weight of one, each of edges 524, 526, and 528 that originate at load 504 has an edge weight of one, and edge 534 that originates at load 510 has an edge weight of one.

Device compiler and linker 324 is configured to accumulate the edge weights for the longest path from each node of graph 520 towards the root of graph 520, similar to step 408 of the method 400. In the example describe herein, the root of graph 520 is load 502. The accumulated edge weights for a given node may be accumulate by tracing all edges connected to that node upwards towards the root of graph 520. For each unique path, device compiler and linker 324 counts the number of edges included within that path. Then, device compiler and linker 324 identifies the path with the most edges and determines that total weight of that path. The total weight of a given path is equal to the sum of all edge weights in that path. In situations where a given node is associated with two paths having equal length that exceeds the length of all other paths associated with the node, device compiler and linker 324 may select the path having the greatest accumulated edge weights.

Once device compiler and linker 324 has computed accumulated edge weights for each node of graph 520, device compiler and linker 324 may the rank all such nodes according to those accumulated edge weights, similar to step 410 of the method 400. The ranking of a given node reflects the accumulated edge weights. In FIG. 5B, load 502 and 504 both have a ranking of zero, add 506, store 508, and load 510 all have a ranking of one, and add 512 and subtract 514 both have a ranking of two.

Device compiler and linker 324 may then group together instructions associated with nodes having the same rank, similar to step 412 of the method 400, and then insert yield instructions 538 and 540 after each strand, similar to step 414 of the method 400. The strands produced by device compiler and linker 324 are shown in FIG. 5C.

FIG. 5C illustrates strands 550, 552, and 554 generated from graph 520 shown in FIG. 5B, according to one embodiment of the present invention. As shown, strands 550, 552, and 554 each include instructions associated nodes of graph 520 having the same ranking. In particular, strand 550 includes load 502 and load 504, each having a ranking of zero, strand 552 includes add 506, store 508, and load 510, each having a ranking of one, and strand 554 includes add 512 and subtract 514, each having a ranking of two. In addition, each strand includes a yield instruction. Strand 550 includes yield 538, strand 552 includes yield 540, and strand 554 includes yield 542.

Device compiler and linker 324 is configured to modify program code to include yield instructions, such as yield 538, 540 and 542, in order to cause threads executing different strands to yield hardware resources at certain points, as discussed. In the example described in conjunction with FIGS. 5A-5C, a first thread may execute strand 550 and then yield hardware resources by executing yield 538 as the final instruction within strand 550. A second thread may acquire those hardware resources, execute strand 552, and then yield the hardware resources by executing yield 540 as the final instruction within strand 552. A third thread may then acquire the hardware resources, execute strand 554, and then yield the hardware resources to a subsequent thread by executing yield 542 as the final instruction within strand 554.

In short, the approach described thus far provides a mechanism through which threads configured to execute different portions of program code 310 may efficiently share hardware resources without requiring other threads to wait while long-latency instructions are in flight. As mentioned above, the approach described herein may also be applicable to hide latencies associated with variable-latency instructions with non-deterministic execution times. Although this approach has been discussed relative to the example provided in conjunction with FIGS. 5A-5C, persons skilled in the art will appreciate that the general approach described therein and in conjunction with FIG. 4 is applicable to sequences of instructions (such as program code 310) having widely differing levels of complexity.

In some situations, program code 310 may include exceedingly lengthy sequences of long-latency instructions. In order to avoid saturating memory bandwidth and register file space by placing numerous long-latency instructions in flight simultaneously, device compiler and linker 324 may implement an approach related to that described in conjunction with FIGS. 4-5C that accounts for hardware-imposed constraints (such as, e.g. maximum memory bandwidth). That approach is described in greater detail below in conjunction with FIG. 6.

FIG. 6 is a flow diagram of method steps for grouping instructions into different strands that may be executed by different threads according to hardware-imposed constraints on the number of long-latency instructions allowed per strand, according to one embodiment of the present invention. Although the method steps are described in conjunction with the systems of FIGS. 1-3 and 5A-5C, persons skilled in the art will understand that any system configured to perform the method steps, in any order, is within the scope of the present invention.

As shown, a method 600 begins at step 602, where device compiler and linker 324 determines that N long-latency instructions are allowed per strand, where N is a positive integer. In the context of this disclosure N, represents the maximum number of long-latency instructions associated with a given thread that should be in flight at any given time. Device compiler and linker 324 could determine N through several different approaches. In one embodiment, device compiler and linker 324 may query PPU 202 and determine the memory bandwidth provided by memory interface 214 and PP memory 204. Device compiler and linker 324 may then compute the maximum number of long-latency instructions associated with a given thread that should be in flight at any given time based on that memory bandwidth and based on a set of predetermined heuristics. Those heuristics could be derived from empirical experiments involving different types of PPUs 202.

In another embodiment, device compiler and linker 324 may execute a diagnostic program in order to test the available memory bandwidth provided by PPU 202. Based on the results of that diagnostic program and based on a set of predetermined heuristics, device compiler and linker 324 could determine the maximum number of long-latency instructions associated with a given thread that should be in flight at any given time. In yet another embodiment, N is a configurable parameter provided by the developer of program code 310. Persons skilled in the art will recognize that other approaches for deriving N from the hardware resources provided by PPU 202 may be applicable in the context of the approaches described herein.

At step 604, device compiler and linker 324 generates a graph for program instructions in a basic block of code derived from program code 310, updates and accumulates edge weights of that graph, and ranks the nodes included within the graph. Step 604 of the method 600 may be similar to steps 402, 404, 406, 408, and 410 of the method 400. In particular, at step 604, device compiler and linker 324 may update the edge weights associated with the graph, similar to steps 404 and 406 of the method 400. In addition, device compiler and linker 324 may accumulate edge weights for the longest path towards the root of the graph for each node when performing step 604, similar to step 408 of the method 400. Lastly, device compiler and linker 324 may rank all nodes of the graph according to the accumulate edge weights, similar to step 410 of the method 400.

At step 606, device compiler and linker 324 removes N or fewer nodes associated with long-latency instructions and having the lowest rank from the graph. At step 608, device compiler and linker 324 removes nodes associated with other instructions having the lowest rank from the graph. At step 610, device compiler and linker 324 inserts the instructions associated with the nodes removed at steps 604 and 606 into a new strand. At step 612, device compiler and linker 324 adds a yield instruction to the end of the new strand. The new strand includes a number of long-latency instructions that does not violate the hardware imposed constraints determined at step 602. When executed by a thread, the new strand may cause N or fewer long-latency instructions to be initiated, and the thread may then yield hardware resources so that other threads may perform other operations using those hardware resources.

At step 614, device compiler and linker 324 updates the edge weights of the graph. Since certain nodes and the corresponding instructions were removed at steps 604 and 606, the edges associated with those nodes may also be removed. And, the accumulated edge weights that included weights from the removed edges may be updated to account for the removed edges. At step 616, device compiler and linker 324 determines whether the graph includes additional nodes. If device compiler and linker 324 determines that all nodes have been removed from the graph, then the method 600 ends. Otherwise, if device compiler and linker 324 determines that more instructions are included in the graph, then the method 600 returns to step 604 and proceeds as described above.

With the approach describe above, device compiler and linker 324 may iteratively generate strands from a given graph and then update that graph. Each strand generated during a given iteration may include a number of long-latency instructions that should not saturate memory bandwidth or waste excessive register file space when executed. The number of long-latency instructions allowed per strand is configurable based on available hardware resources, and so the approach described thus far may be tuned to account for specific hardware resources. This approach is described in greater detail by way of example below in conjunction with FIGS. 7A-7F.

Figure 7A:
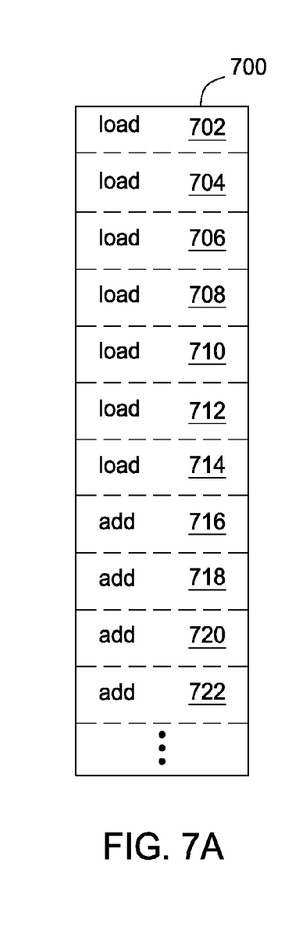
FIGS. 7A-7F illustrate an exemplary application of the method steps of FIG. 6 to an exemplary basic block of program code, according to one embodiment of the present invention.

FIGS. 7A-7F illustrate an exemplary application of the method steps of FIG. 6 to an exemplary basic block of program code, according to one embodiment of the present invention. FIG. 7A illustrates a basic block 700 of program code that may be separated into strands, according to one embodiment of the invention.

As shown, basic block 700 includes a sequence of instructions, including loads 702, 704, 706, 708, 710, 712, and 714, as well as adds 716, 718, 720, and 722. The different instructions shown in FIG. 7A may have dependencies between one another. Those dependencies may be captured when device compiler and linker 324 generates a graph based on basic block 700, as described in greater detail below in conjunction with FIG. 7B.

Figure 7B:
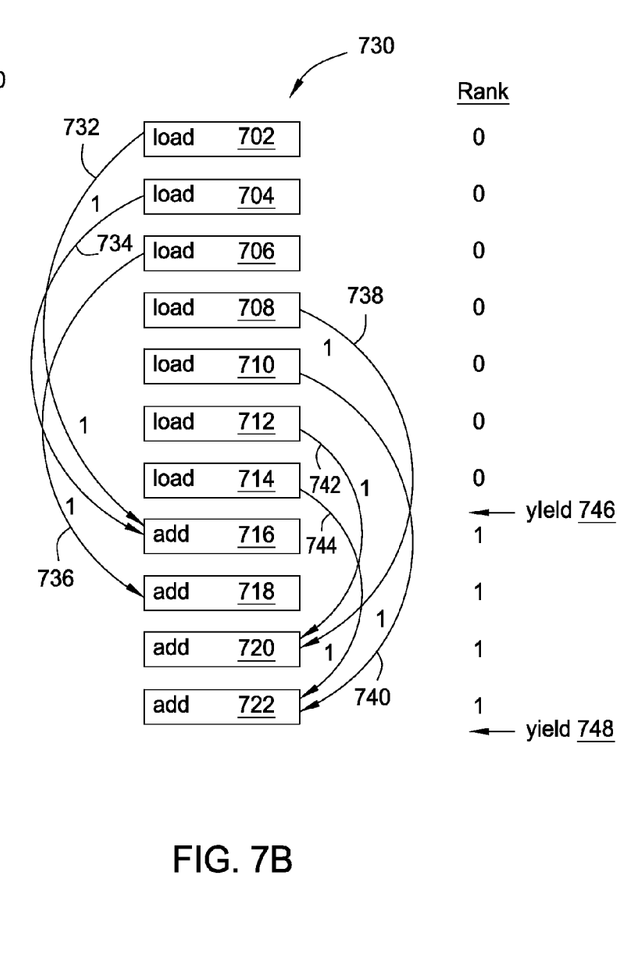

FIG. 7B illustrates a graph 730 that includes nodes representing the instructions shown in FIG. 7A as well as edges that connect those nodes to one another and represent dependencies between the associated instructions, according to one embodiment of the present invention. As shown, edge 732 couples load 702 to add 716, edge 734 couples load 704 to add 716, edge 736 couples load 706 to add 718, edge 738 coupes load 738 to add 720, edge 740 couples load 710 to add 722, edge 742 couples load 712 to add 720, and edge 744 couples load 714 to add 722. Again, the edges included within graph 730 represent dependencies between the instructions included within that graph.

Device compiler and linker 324 is configured to generate graph 730 by implementing a similar technique as described in conjunction with FIGS. 4 and 5B. In doing so, device compiler and linker 324 may generate edge weights for graph 730 with initial values of zero and updated values of one for edges originating at nodes associated with long-latency instructions. Device compiler and linker 324 may also accumulate edge weights for the longest path from each node of graph 730 towards the root of graph 730, and then rank the nodes of graph 730 according to those accumulated edge weights. The ranking of a given node reflects the accumulated edge weights. In FIG. 7B, loads 702, 704, 706, 708, 710, 712, and 714 have a ranking of 0, while adds 716, 718, 720, and 722 have a ranking of one.

If device compiler and linker 324 were to implement the technique described in conjunction with FIGS. 4 and 5A-5C, then device compiler and linker 324 would group together instructions associated with nodes having the same rank and insert yield instructions 746 and 748 after each strand. However, applying that technique to the particular instructions included within basic block 700 could cause certain problems outlined in conjunction with FIG. 7C.

Figure 7C:
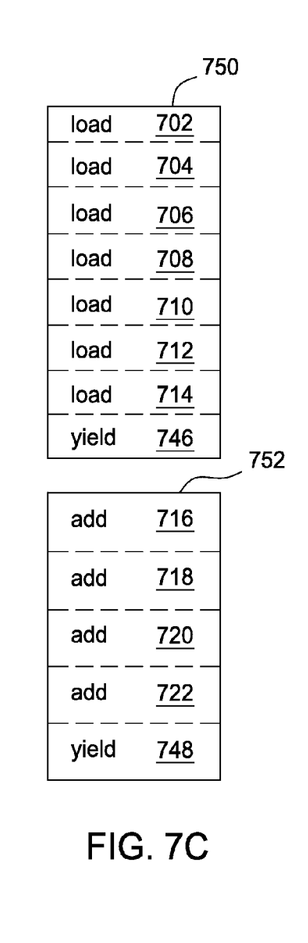

FIG. 7C illustrates strands 750 and 752 generated from graph 730 shown in FIG. 7B, according to one embodiment of the present invention. As shown, strands 750 and 752 each include instructions associated with nodes of graph 730 having the same ranking. In particular, strand 750 includes loads 702, 704, 706, 708, 710, 712, and 714, each having a ranking of zero, and strand 752 includes adds 716, 718, 720, and 722, each having a ranking of one. In addition, each strand includes a yield instruction. Strand 750 includes yield 746, and strand 752 includes yield 748. Again, strands 750 and 752 could be generated by device compiler and linker 324 if device compiler and linker 324 were to implement the approach described in conjunction with FIGS. 4 and 5A-5C. However, as mentioned, that approach could cause certain problems.

Specifically, a thread configured to execute strand 750 would issue seven simultaneous long-latency load instructions, which could saturate memory bandwidth and consume excessive register file space. With seven long-latency instructions associated with a single thread in flight simultaneously, the overall memory access throughput of PPU 202 could be significantly affected. Accordingly, device compiler and linker 324 is configured to generate strands for graph 730 that account for the memory bandwidth provided by PPU 202 as well as other hardware-imposed constraints. In doing so, device compiler and linker 324 may determine that a particular number of long-latency instructions may be allowed per strand, similar to step 602 of the method 600 shown in FIG. 6. Then, device compiler and linker 324 may generate strands for graph 730 that include an appropriate number of long-latency instructions, as described in greater detail below in conjunction with FIG. 7D.

Figure 7D:
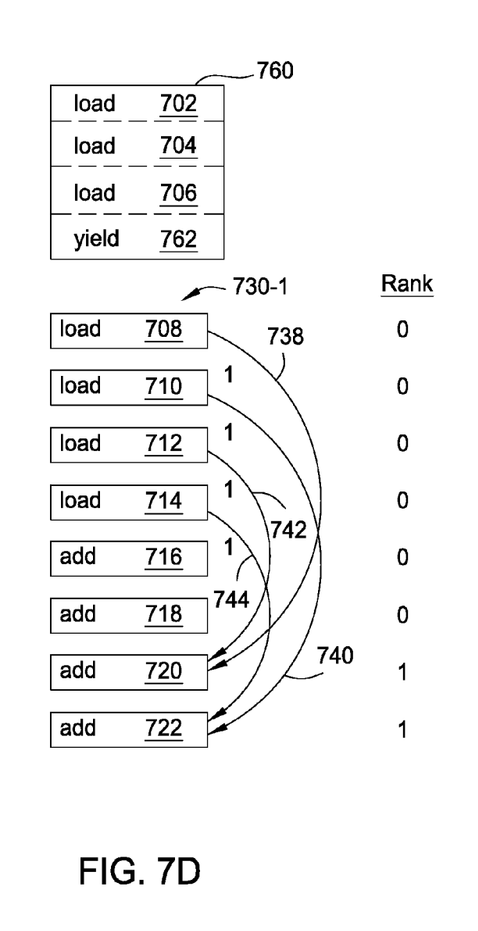

FIG. 7D illustrates a strand 760 and a portion 730-1 of graph 730 shown in FIG. 7B. In the example discussed herein, device compiler and linker 324 may determine that a maximum of three long-latency instructions should be included within any given strand, similar to step 602 of the method 600, where N=3. Device compiler and linker 324 is configured to remove N=3 or fewer nodes associated with long-latency instructions and to then insert those instructions into strand 760, similar to steps 606 and 610 of the method 600. Device compiler and linker 324 is also configured to add a yield 762 to strand 760, similar to step 612 of the method 600. A thread that executes strand 760 may thus issue load instructions 702, 704, and 706 and then release hardware resources allocated to that thread by executing yield 762.

Once the nodes associated with loads 702, 704, and 706 have been removed from graph 730 to produce graph 730-1, device compiler and linker 324 may then update the rankings of the remaining nodes to reflect that the edges associated with the removed nodes have also been removed, similar to step 614 of the method 600. In FIG. 7D, adds 716 and 718 now have a ranking of zero.

Device compiler and linker 324 may then determine that additional nodes are included within graph 730, similar to step 616 of the method 600, and then repeat certain steps of the method 600. In doing so, device compiler and linker 324 may generate additional strands for execution by other threads, as described in greater detail in conjunction with FIG. 7E.

Figure 7E:
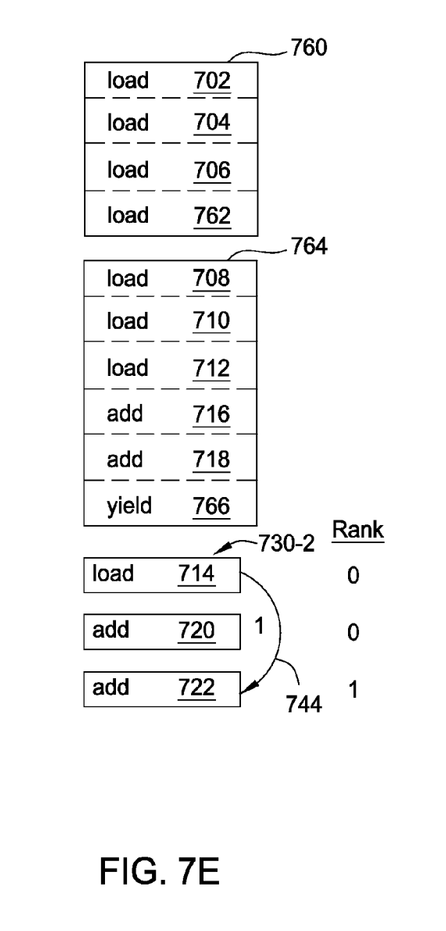

FIG. 7E illustrates strand 760 also shown in FIG. 7D, as well as strand 764 and graph 730-2. Device compiler and linker 324 is configured to remove an additional three nodes (i.e. the nodes associated with loads 708, 710, and 712) from graph 730-1 shown in FIG. 7D and to insert the instructions associated with those nodes into strand 764, similar to steps 608 and 610 of the method 600.

In addition, device compiler and linker 324 is configured to remove the nodes associated with adds 716 and 718 from graph 730-1 and insert the instructions associated with those nodes into strand 764, similar to step 608 of the method 600. Device compiler and linker 324 is also configured to add a yield 766 to strand 764, similar to step 612 of the method 600. A thread that executes strand 764 may thus issue load instructions 708, 710 and 712, as well as add instructions 716 and 718, and then release hardware resources allocated to that thread by executing yield 766.

Once the nodes associated with loads 708, 710, and 712, as well those associated with adds 716 and 718 have been removed from graph 730-1 to produce graph 730-2, device compiler and linker 324 may then update the rankings of the remaining nodes to reflect that the edges associated with the removed nodes have also been removed, similar to step 614 of the method 600. In FIG. 7E, add 720 now has a ranking of zero.

Device compiler and linker 324 may then determine that additional nodes are included within graph 730, similar to step 616 of the method 600, and then repeat certain steps of the method 600. In doing so, device compiler and linker 324 may generate additional strands for execution by other threads, as described in greater detail in conjunction with FIG. 7F.

Figure 7F:
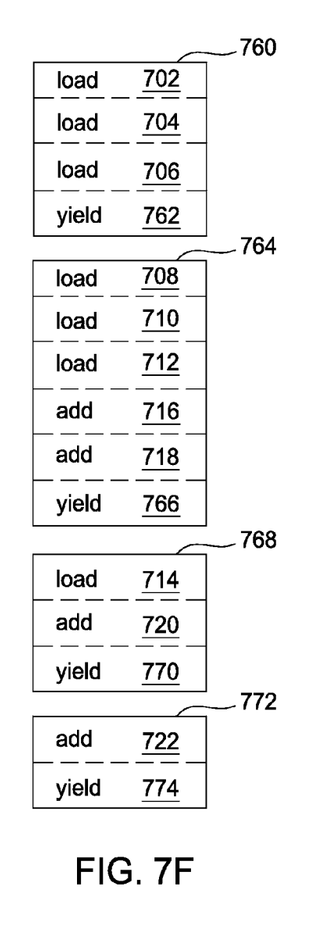

FIG. 7F illustrates strands 760 and 764 also shown in FIG. 7E, as well as strands 768 and 772. Device compiler and linker 324 is configured to remove the nodes associated with load 714 and add 720 from graph 730-2 and to insert the instructions associated with those nodes into strand 768, similar to steps 608 and 610 of the method 600. Device compiler and linker 324 is also configured to add a yield 770 to strand 768, similar to step 612 of the method 600. A thread that executes strand 768 may thus issue load instruction 714 and add instruction 720, and then release hardware resources allocated to that thread by executing yield 770.

Device compiler and linker may then remove the node associated with add 722 from graph 730-2 and insert add 722 into strand 772, similar to steps 608 and 610 of the method 600. Device compiler and linker 324 is also configured to add yield 774 to strand 762, similar to step 612 of the method 600. A thread that executes strand 772 may thus issue load instruction 714 and add instruction 720, and then release hardware resources allocated to that thread by executing yield 770.

In the example described in conjunction with FIGS. 7A-7F, four separate threads may independently execute the instructions included within strands 760, 764, 768, and 772, respectively. When a given one of those threads executes a yield instruction associated with a strand that corresponds to that thread, the thread may release hardware resources in order to allow other threads to execute instructions associated with other strands.

In general, the approach described in conjunction with FIGS. 6 and 7A-7F provides a mechanism through which threads configured to execute different portions of program code 310 may efficiently share hardware resources and minimize latency penalties associated with long-latency instructions, while avoiding bandwidth saturation and excessive register file usage. Although this approach has been discussed relative to the example provided in conjunction with FIGS. 7A-7F, persons skilled in the art will appreciate that the general approach described therein and in conjunction with FIG. 6 is applicable to sequences of instructions (such as program code 310) having widely differing levels of complexity.

In sum, a device compiler and linker is configured to group instructions into different strands for execution by different threads based on the dependence of those instructions on other, long-latency instructions. A thread may execute a strand that includes long-latency instructions, and then hardware resources previously allocated for the execution of that thread may be de-allocated from the thread and re-allocated to another thread. The other thread may then execute another strand while the long-latency instructions are in flight. With this approach, the other thread is not required to wait for the long-latency instructions to complete before acquiring hardware resources and initiating execution of the other strand, thereby eliminating at least a portion of the time that the other thread would otherwise spend waiting.

Advantageously, a processing core that executes the different strands may operate more efficiently and with fewer idle cycles compared to conventional processing cores, thereby increasing the processing throughput of that processing core as well as the energy efficiency of the processing core.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as compact disc read only memory (CD-ROM) disks readable by a CD-ROM drive, flash memory, read only memory (ROM) chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for compiling program code for execution on a processing unit, the method comprising:
   generating a weight value for each program instruction included in a basic block of the program code, wherein the weight value associated with a given program instruction reflects a number of long-latency program instructions upon which the given program instruction depends;
   grouping the program instructions included in the basic block into a first strand and a second strand based on the weight values generated for the program instructions, wherein the first strand includes a first set of program instructions, each program instruction included in the first set of program instructions has a first weight value, and the second strand includes a second set of program instructions, and each program instruction included in the second set of program instructions has a second weight value;
   causing a first thread to process the first strand; and
   causing a second thread to process the second strand.

2. The computer-implemented method of claim 1, further comprising inserting a first yield instruction into the first strand, wherein the first thread is configured to process the first strand by:
   acquiring a hardware resource associated with a processing core included in the processing unit;
   executing the first set of program instructions on the processing core; and
   executing the first yield instruction on the processing core to release the hardware resource associated with the processing core.

3. The computer-implemented method of claim 2, further comprising inserting a second yield instruction into the second strand, wherein the second thread is configured to process the second strand by:
   acquiring the hardware resource associated with the processing core in response to the first thread executing the first yield instruction;
   executing the second set of program instructions on the processing core; and
   executing the second yield instruction on the processing core to release the hardware resource associated with the processing core.

4. The computer-implemented method of claim 1, wherein generating a weight value for each program instruction included in the basic block comprises:
   generating a graph of the program instructions included in the basic block that includes a different node for each program instruction in the basic block and a different edge for each dependency between at least two different program instructions;
   initializing to a value of zero a plurality of edge weights, wherein each edge weight corresponds to a different edge in the graph;
   setting to a value of one each edge weight corresponding to an edge that originates at a node associated with a long-latency program instruction; and
   for a given program instruction included in the basic block, accumulating one or more edge weights along a set of edges that couple the node associated with the given program instruction to a root of the graph.

5. The computer-implemented method of claim 4, wherein grouping the program instructions in the basic block into the first strand comprises:
   determining that N or fewer long-latency program instructions should be included in a given strand based on an amount of available memory bandwidth associated with a processing core included in the processing unit, wherein N is a positive integer;
   removing from the graph a first set of nodes, wherein each node in the first set of nodes is associated with a long-latency program instruction having the first weight value; and
   inserting the long-latency program instructions associated with the first set of nodes into the first strand.

6. The computer-implemented method of claim 5, wherein grouping the program instructions in the basic block into the second strand comprises:
   removing from the graph each edge coupled to a node included in the first set of nodes;
   generating updated weight values for program instructions associated with a set of remaining nodes in the graph;
   removing from the graph a second set of nodes, wherein each node included in the second set of nodes is associated with a long-latency program instruction having the second weight value; and
   inserting the long-latency program instructions associated with the second set of nodes into the second strand.

7. The computer-implemented method of claim 6, wherein generating the updated weight value for a given program instruction comprises accumulating one or more edge weights along a set of remaining edges in the graph that couple a node included in the set of remaining nodes and associated with the given program instruction to the root of the graph.

8. The computer-implemented method of claim 5, further comprising executing a portion of the program code on the processing core to determine the amount of available memory bandwidth associated with the processing core.

9. A non-transitory computer-readable medium storing program instructions that, when executed by a processing unit, cause the processing unit to compile program code for execution on a processing unit by performing the steps of:
   generating a weight value for each program instruction included in a basic block of the program code, wherein the weight value associated with a given program instruction reflects a number of long-latency program instructions upon which the given program instruction depends;
   grouping the program instructions included in the basic block into a first strand and a second strand based on the weight values generated for the program instructions, wherein the first strand includes a first set of program instructions, each program instruction included in the first set of program instructions has a first weight value, and the second strand includes a second set of program instructions, and each program instruction included in the second set of program instructions has a second weight value;
   causing a first thread to process the first strand; and
   causing a second thread to process the second strand.

10. The non-transitory computer-readable medium of claim 9, further comprising the step of inserting a first yield instruction into the first strand, wherein the first thread is configured to process the first strand by:

acquiring a hardware resource associated with a processing core included in the processing unit;
executing the first set of program instructions on the processing core; and
executing the first yield instruction on the processing core to release the hardware resource associated with the processing core.

11. The non-transitory computer-readable medium of claim 10, further comprising the step of inserting a second yield instruction into the second strand, wherein the second thread is configured to process the second strand by:
acquiring the hardware resource associated with the processing core in response to the first thread executing the first yield instruction;
executing the second set of program instructions on the processing core; and
executing the second yield instruction on the processing core to release the hardware resource associated with the processing core.

12. The non-transitory computer-readable medium of claim 9, wherein the step of generating a weight value for each program instruction included in the basic block comprises:
generating a graph of the program instructions included in the basic block that includes a different node for each program instruction in the basic block and a different edge for each dependency between at least two different program instructions;
initializing to a value of zero a plurality of edge weights, wherein each edge weight corresponds to a different edge in the graph;
setting to a value of one each edge weight corresponding to an edge that originates at a node associated with a long-latency program instruction; and
for a given program instruction included in the basic block, accumulating one or more edge weights along a set of edges that couple the node associated with the given program instruction to a root of the graph.

13. The non-transitory computer-readable medium of claim 12, wherein the step of grouping the program instructions in the basic block into the first strand comprises:
determining that N or fewer long-latency program instructions should be included in a given strand based on an amount of available memory bandwidth associated with a processing core included in the processing unit, wherein N is a positive integer;
removing from the graph a first set of nodes, wherein each node in the first set of nodes is associated with a long-latency program instruction having the first weight value; and
inserting the long-latency program instructions associated with the first set of nodes into the first strand.

14. The non-transitory computer-readable medium of claim 13, wherein the step of grouping the program instructions in the basic block into the second strand comprises:
removing from the graph each edge coupled to a node included in the first set of nodes;
generating updated weight values for program instructions associated with a set of remaining nodes in the graph;
removing from the graph a second set of nodes, wherein each node included in the second set of nodes is associated with a long-latency program instruction having the second weight value; and
inserting the long-latency program instructions associated with the second set of nodes into the second strand.

15. The non-transitory computer-readable medium of claim 14, wherein generating the updated weight value for a given program instruction comprises accumulating one or more edge weights along a set of remaining edges in the graph that couple a node included in the set of remaining nodes and associated with the given program instruction to the root of the graph.

16. The non-transitory computer-readable medium of claim 13, further comprising the step of executing a portion of the program code on the processing core to determine the amount of available memory bandwidth associated with the processing core.

17. A system configured to compile program code for execution on a processing unit, including:
a processor configured to:
generate a weight value for each program instruction included in a basic block of the program code, wherein the weight value associated with a given program instruction reflects a number of long-latency program instructions upon which the given program instruction depends;
group the program instructions included in the basic block into a first strand and a second strand based on the weight values generated for the program instructions, wherein the first strand includes a first set of program instructions, each program instruction included in the first set of program instructions has a first weight value, and the second strand includes a second set of program instructions, and each program instruction included in the second set of program instructions has a second weight value;
cause a first thread to process the first strand; and
cause a second thread to process the second strand.

18. The system of claim 17, further including:
a memory coupled to the processor and storing program instructions that, when executed by the processor, cause the processor to:
generate the weight value for each program instruction included in the basic block of the program code;
group the program instructions included in the basic block into the first strand and the second strand;
cause the first thread to process the first strand; and
cause the second thread to process the second strand.

19. The system of claim 17, wherein the processor is further configured to insert a first yield instruction into the first strand, and wherein the first thread is configured to process the first strand by:
acquiring a hardware resource associated with a processing core included in the processing unit;
executing the first set of program instructions on the processing core; and
executing the first yield instruction on the processing core to release the hardware resource associated with the processing core.

20. The system of claim 19, wherein the processor is further configured to insert a second yield instruction into the second strand, and wherein the second thread is configured to process the second strand by:
acquiring the hardware resource associated with the processing core in response to the first thread executing the first yield instruction;
executing the second set of program instructions on the processing core; and
executing the second yield instruction on the processing core to release the hardware resource associated with the processing core.

* * * * *